US009959523B2

(12) United States Patent
Lewis et al.

(10) Patent No.: US 9,959,523 B2
(45) Date of Patent: May 1, 2018

(54) AGGREGATING A LIST OF CURRENT, CONTEXTUALLY AND/OR MEMBER-WISE RELEVANT VIDEO CONFERENCES

(75) Inventors: Justin Lewis, Marina Del Rey, CA (US); Shiva Jaini, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 1431 days.

(21) Appl. No.: 13/415,741

(22) Filed: Mar. 8, 2012

(65) Prior Publication Data

US 2013/0239024 A1 Sep. 12, 2013

(51) Int. Cl.
| | | |
|---|---|---|
| G06F 3/00 | (2006.01) | |
| G06Q 10/10 | (2012.01) | |
| H04N 7/14 | (2006.01) | |
| H04N 7/15 | (2006.01) | |

(52) U.S. Cl.
CPC ............ *G06Q 10/10* (2013.01); *H04N 7/147* (2013.01); *H04N 7/15* (2013.01)

(58) Field of Classification Search
CPC ...... H04N 7/15; H04N 5/272; H04N 21/4788; G06F 3/0482; G06F 3/04817; G06F 3/04847; G06F 17/30345; G06F 3/0485; G06F 3/0486; G06F 3/0488
See application file for complete search history.

(56) References Cited

U.S. PATENT DOCUMENTS

| | | | | |
|---|---|---|---|---|
| 2003/0126027 A1* | 7/2003 | Nelson | ............ | G06F 17/30873 705/26.1 |
| 2006/0164508 A1* | 7/2006 | Eshkoli | ................. | H04N 7/147 348/14.09 |
| 2011/0258507 A1* | 10/2011 | Rideout | ............. | H04L 12/1822 714/746 |
| 2012/0092438 A1* | 4/2012 | Guzman Suarez | ...... | H04N 7/15 348/14.03 |

FOREIGN PATENT DOCUMENTS

| | | |
|---|---|---|
| CN | 1551632 A | 12/2004 |
| CN | 102172007 A | 8/2011 |

OTHER PUBLICATIONS

PCT Notification of Transmittal of the International Search Report and the Written Opinion of the International Searching Authority, or the Declaration for International application No. PCT/US2013/030032 dated May 21, 2013, 18 pages.

* cited by examiner

*Primary Examiner* — Jeffrey A Gaffin
*Assistant Examiner* — Ayesha Huertas Torres
(74) *Attorney, Agent, or Firm* — Lowenstein Sandler LLP (57) ABSTRACT

This disclosure includes a system, device, and method to aggregate a list of video conferences for a user. The method may include identifying one or more video conferences that are likely to be of interest to a user viewing a web page, and providing a list comprising the video conferences that are likely to be of interest to the user, where each video conference in the list is available to be joined by the user (Continued)

viewing the web page without an invitation from participants of the video conference.

22 Claims, 7 Drawing Sheets

AGGREGATING A LIST OF CURRENT, CONTEXTUALLY AND/OR MEMBER-WISE RELEVANT VIDEO CONFERENCES

TECHNICAL FIELD

Embodiments of the present invention relate to the field of videoconferencing and, more particularly, to aggregating a list of current, contextually and/or member-wise relevant video conferences.

BACKGROUND

Videoconferencing is used to provide multiple participants located at different locations the ability to communicate with each other. In particular, videoconferencing systems often utilize personal computers having web cameras to capture and transmit audio/video content to other users via the Internet. An organizer of such a videoconference usually selects participants for a videoconference and invites them to the videoconference by, for example, sending them a link associated with the videoconference or a notification that they have been invited to join the videoconference. Accordingly, users are typically unaware of currently available videoconferences and have to wait for an invitation or a notification in order to join a videoconference.

SUMMARY

In one embodiment, a method to aggregate a list of video conferences for a user is provided. The method includes identifying one or more video conferences that are likely to be of interest to a user viewing a web page, and providing a list including the video conferences that are likely to be of interest to the user, where each video conference in the list is available to be joined by the user viewing the web page without an invitation from participants of the video conference.

In another embodiment, a method to aggregate a list of video conferences for a user includes presenting a web page for viewing by the user, receiving a list including one or more video conferences with context relevant to at least one of one or more topics identified as topics of interest to the user, and presenting the list to the user, wherein each video conference in the list is available to be joined by the user viewing the web page without an invitation from a participant of the video conference. The method may further include enabling the user viewing the list to join a video conference selected from the list.

In some embodiments, a computing device to aggregate a list of video conferences for a user is provided. The computing device includes a memory and a processing device, coupled to the memory, to present a web page for viewing by the user, to receive a list including one or more video conferences with context relevant to at least one of one or more topics identified as topics of interest to the user, to present the list to the user, wherein each video conference in the list is available to be joined by the user viewing the web page without an invitation from a participant of the video conference, and to enable the user viewing the web page to join a video conference selected from the list.

BRIEF DESCRIPTION OF THE DRAWINGS

The present invention will be understood more fully from the detailed description given below and from the accompanying drawings of various embodiments of the invention.

DETAILED DESCRIPTION

A video conference system and method for aggregating a list of video conferences for a user are described. A video conference system maintains multiple video conferences (also referred to as video chat or video conference rooms or video chat rooms herein) created by different users at various points in time. Video conference rooms may have different participants and may relate to different contexts. A context of a video conference may pertain, for example, to a topic or content discussed or posted before or during the video conference.

In one embodiment, the video conference system identifies currently available video conferences (e.g., active or live video chats that are open for participation by a user), selects video conferences that are contextually and/or member-wise relevant to the user, and presents a list of the selected video conferences to the user. The list of the selected video conferences may be presented when the user is viewing (or listening to) content (e.g., a video clip, a news article, an audio recording, etc.) provided by a website. Contextually relevant video conferences may include video conferences with a topic that is likely to be of interest to the user. Topics that are likely to be of interest to a user may be identified based on, for example, as permitted by the user, content items currently or previously presented to the user, content items recommended to the user, search requests submitted by the user, a web browsing history of the user, a profile of the user, video conferences sponsored, created or attended by the user, etc. For example, if a user is searching for a specific movie, the list presented to the user may include available video conferences having this movie as the topic or having content involving this movie (e.g., video conferences where participants discuss the movie or post video clips from the movie).

Member-wise relevant video conferences may include video conferences with participants who have a relationship with the user. Participants who have a relationship with the user may include, for example, as permitted by the user and the participants, friends of the user, participants who have a history of engagement with the user (e.g., as colleagues, clients or business partners), participants who provide content subscribed by the user, participants with a content browsing history similar to that of the user, participants having affiliations similar to those of the user, etc. For instance, the list presented to the user may include video conferences hosted by a friend of the user, or video conferences hosted by a person who provides content to which the user subscribes (e.g., a person whose website postings, social media posts, or video conferences the user has subscribed to be notified of or receive).

The list of video conferences presented to the user may be updated in real time as relevant video conferences are created or become no longer available, and/or as their participants or context are modified. The user can select a video conference from the list and join the selected video conference without waiting for an invitation from any participant of the selected video conference.

Embodiments of the present invention improve user experience with video conferences. A user can now easily find a video conference with participants who the user is likely to enjoy interacting with and/or about a topic in which the user is likely to be interested.

Figure 1:
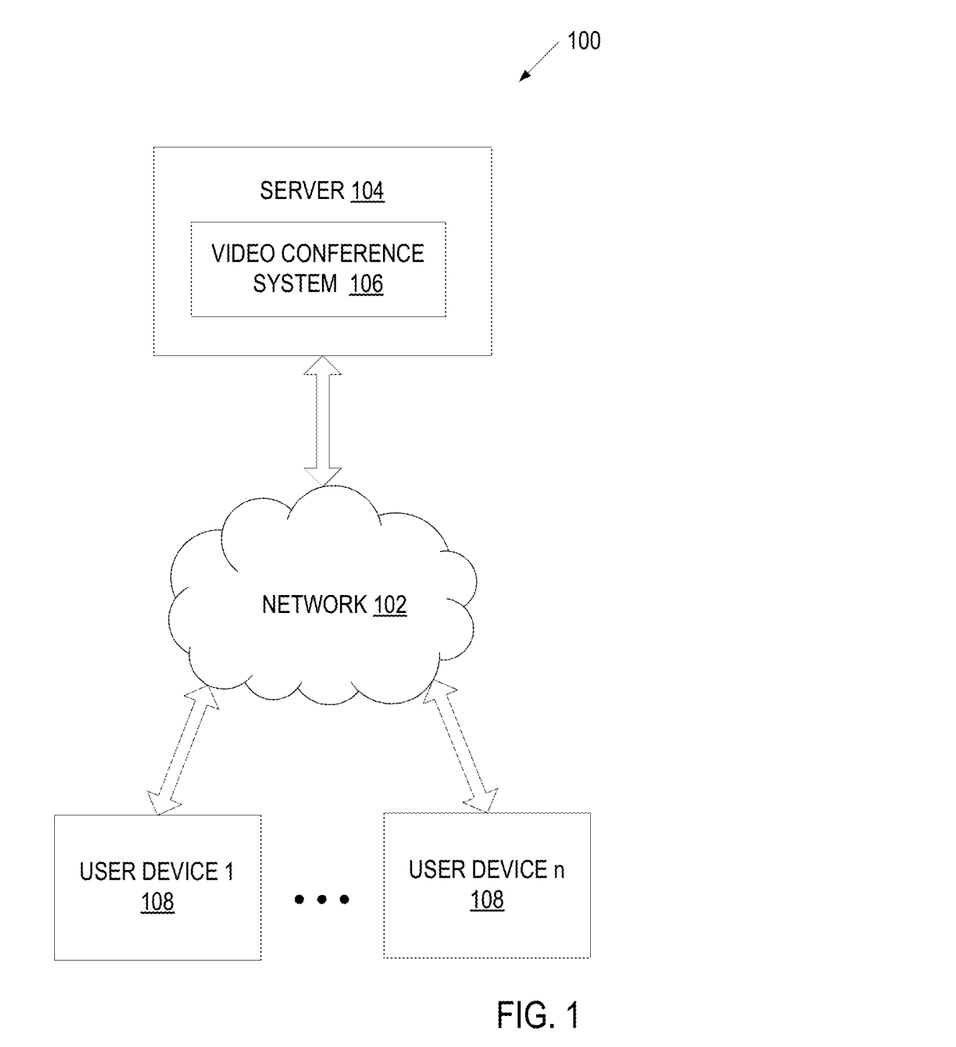
FIG. 1 illustrates an exemplary network architecture, in accordance with one embodiment of the disclosure.

FIG. 1 illustrates an exemplary network architecture 100, in accordance with one embodiment of the present invention. The network architecture 100 may include a server 104 and multiple user devices 108 coupled to the server 104 via a network 102 (e.g., public network such as the Internet, or private network such as a local area network (LAN), or another network, e.g., a mobile communications network).

The user devices 108 may include any type of computing devices such as portable digital assistants, mobile phones, laptop computers, portable media players, tablet computers, netbooks, notebooks, desktop computers, gaming consoles, DVD players, media centers, and the like. The server 104 may include one or more machines such as one or more server computer systems, routers, gateways, etc.

The server 104 hosts a video conference system 106 that maintains numerous live and/or pre-scheduled video conferences created by various users of user devices 108. Video conferences may be enabled using, for example, streaming video or voice over IP (VoIP) technologies and may be used for personal, entertainment, business or educational or academically oriented interactions. The server 104 may be dedicated to providing video conferencing services or may provide video conferencing services along with other services including, for example, news services, social networking services and/or content hosting services. For instance, the server 104 may allow a user to view a video clip or a news article and start a video conference while viewing the video clip or the news article. In another example, the server 104 may allow a user to start a video conference while visiting a social networking site or video content hosting site.

Video conferences maintained by the video conference system 106 may vary based on time, context and participants, and may include live video conferences (taking place presently) and pre-scheduled video conferences. Live video conferences may include active video conferences that have at least one active participant or inactive video conferences that no longer have any active participants (e.g., if all participants have left the video conference). Users can join a video conference upon receiving an invitation (e.g., a link) from a host or a participant of the video conference. In addition, the video conference system 106 may aggregate a list of live and/or prescheduled video conferences for a user, present the aggregated list to the user, and allow the user to join a video conference selected from the list. The list may be aggregated based on one or more criteria. As will be discussed in more detail below, the criteria may include the status of a video conference (e.g., whether the video conference is active or inactive), context relevance of a video conference, and member-wise relevance of a video conference. In one embodiment, the list includes only public video conferences (e.g., video conferences that are marked as public or are not marked as private or limited access).

The list of video conferences may be presented to a user when the user signs into the video conferencing service or when the user views (or listens to) content on a web page provided by another service (a content hosting service, a news service, a social networking service or the like). In an embodiment, where the list of video conferences is presented to a user when the user views (or listens to) content on a web page provided by another service (e.g., a content hosting service, a news service, a social networking service, etc.), the list of video conferences may be received by the other service from the video conferencing service, and presented to the user who may then be able to join a video conference selected from the list.

The list may be periodically updated to reflect recent changes in available video conferences. In one embodiment, the list includes only video conferences that are likely to be of interest to the user. Alternatively, the list may include all available video conferences and may identify those video conferences that are likely to be of interest to the user (e.g., by underlining, highlighting, ranking, page display arrangement, etc.).

Although the network architecture 100 is illustrated as a client-server environment, the functionality discussed herein may be implemented in a peer-to-peer environment (e.g., the video conference system 106 residing on one or more nodes), a cloud computing environment (e.g., the video conference system 106 residing within a computing cloud), a grid computing environment (e.g., the video conference system 106 residing within a distributed computing system), etc.

Figure 2:
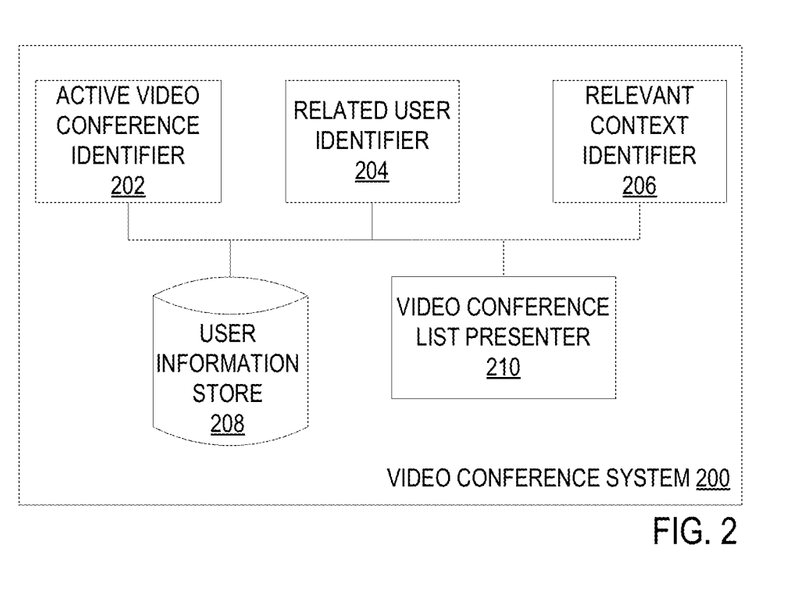
FIG. 2 is a block diagram of one embodiment of a video conference system in accordance with this disclosure.

FIG. 2 is a block diagram of one embodiment of a video conference system 200. The video conference system 200 may be the same as the video conference system 106 of FIG. 1 and may include an active video conference identifier 202, a related user identifier 204, a relevant context identifier 206, a video conference list presenter 210, and a user information store 208. The components of the video conference system 200 may represent modules that can be combined together or separated into further modules, according to various embodiments.

The user information store 208 may store profiles of various users registered with the video conference system 200. A user profile may specify topics in which the user is or may be interested, as well as user demographic data that may be used to determine relevant context for the user, as permitted by the user. The user information store 208 may also store other data about individual users as permitted by the user. This data may specify, for example, content subscribed by a user and the source of this content, individuals whose video conferences the user would like to be subscribed to, etc.

The video conference list presenter 210 aggregates lists of video conferences for specific users based on various criteria and presents these lists to corresponding users. The criteria may be the same for all users or may vary for different users based on user preferences specified in the user profiles. The video conference list presenter 210 may initiate the aggregation process upon detecting a user online activity on a website associated with the video conference system 200 (e.g., receiving an indication that a search query has been submitted in a content hosting website, receiving an indication of a status update associated with a particular topic (e.g., a football game currently being played) on a social networking website, receiving an indication of the user reading an article on a news website, etc.) or when the user signs into the video conference system 200.

Depending on the criteria used to select video conferences for a user, the video conference list presenter 210 may invoke the active video conference identifier 202, the related user identifier 204 and/or the relevant context identifier 206 sequentially or in parallel to identify video conferences that are likely to be of interest to the user. The active video conference identifier 202 can identify all live video conferences and select video conferences that have at least one active participant. The relevant context identifier 206 identifies video conferences with relevant context. The related user identifier 204 identifies video conferences with participants related to the user.

The relevant context identifier 206 identifies video conferences with relevant context. In one embodiment, the relevant context identifier 206 identifies video conferences with relevant context by determining topics that may be of interest to the user, identifying context of available video conferences (e.g., active, live and/or prescheduled video conferences), and selecting video conferences with the context relevant to any of the topics that may be of interest to the user. Topics that may be of interest to the user may be determined based on, for example, as permitted by the user, content items currently or previously presented to the user, content items recommended to the user, search requests submitted by the user, a web browsing history of the user, a profile of the user, video conferences sponsored, created or attended by the user, etc. The relevant context identifier 206 may request this information from various services as permitted by the user, store the information or metadata about the information in the user information store 208 and periodically update the information or metadata to reflect recent changes. Context of a video conference may be identified based on, as permitted by hosts and/or participants of the video conference, the name of the video conference, the topic of the video conference, the content discussed or posted during the video conference, audio or visual background data used for the video conference, a web page or service that was used to create the video conference (e.g., whether the page or service is related to a content hosting site or a social networking site), the web pages or services used by participants to view the video conference, etc.

The related user identifier 204 identifies video conferences with participants related to the user. In one embodiment, the related user identifier 204 identifies video conferences with participants related to the user by identifying participants of available video conferences or video conferences with relevant context, selecting those participants who are related to the user, and finding video conferences with the related participants. Participants who are related to the user may include, for example, as permitted by the user and participants, friends of the user, participants who have a history of engagement with the user (e.g., as colleagues, clients or business partners), participants who provide content subscribed by the user, participants with a content browsing history similar to that of the user, participants having affiliations similar to those of the user, participants whose video conferences or website postings the user has requested to follow, etc. The related user identifier 204 may request this information from various services, as permitted by the user, store it in the user information store 208 and periodically update it to reflect recent changes. The user information store 208 may represent a single data structure or multiple data structures (tables, databases, repositories, files, etc.) residing on one or more mass storage devices, such as magnetic or optical storage based disks, solid-state drives or hard drives. In an exemplary embodiment, the video conference system 200 notifies users of the types of information that are stored in the user information store 208 and provides the user the opportunity to opt-out of having such information collected and/or shared with the video conference system 200.

The video conference list presenter 210 may update the list of video conferences presented to the user in real time as relevant video conferences are created or become no longer available, and/or as their participants or context are modified. The list may include only video conferences that are likely to be of interest to the user. Alternatively, the list may include all available video conferences and may identify those video conferences that are likely to be of interest to the user (e.g., by underlining, highlighting, ranking, page display arrangement, etc.).

Figure 3:
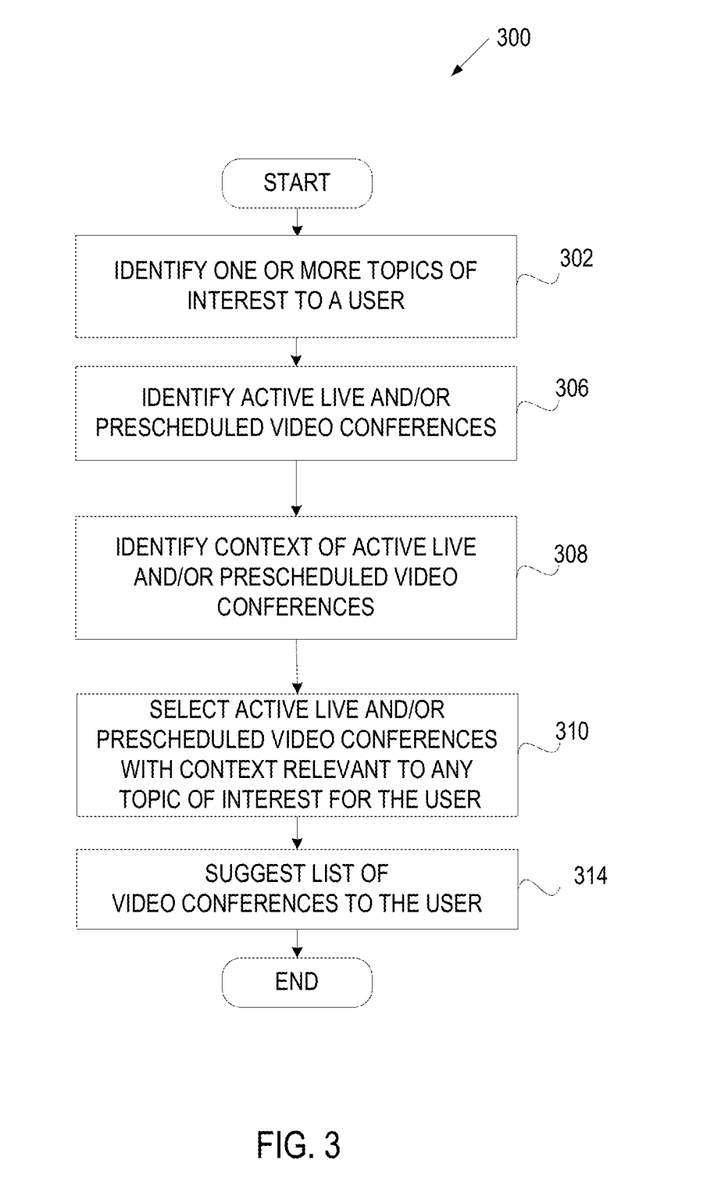
FIG. 3 is a flow diagram of one embodiment of a method for aggregating a list of contextually relevant video conferences in accordance with this disclosure.
Figure 4:
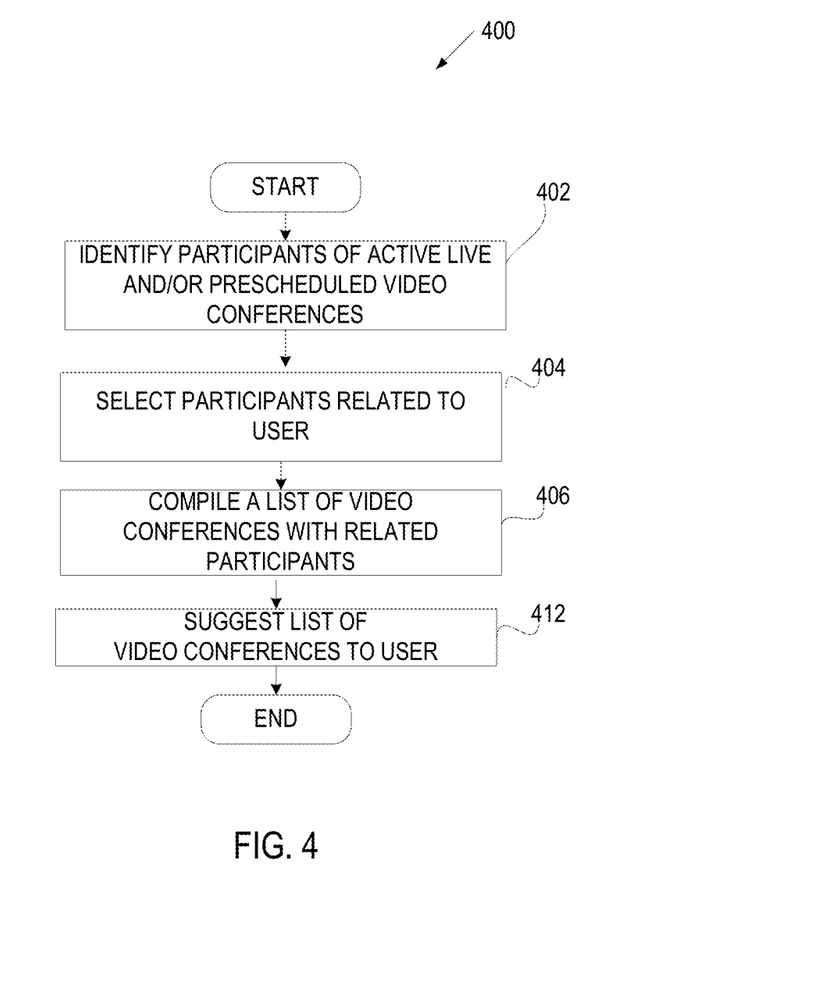
FIG. 4 is a flow diagram of one embodiment of a method for aggregating a list of member-wise relevant video conferences in accordance with this disclosure.

FIGS. 3 and 4 are flow diagrams of various embodiments of methods for generating a list of video conferences for a user. The methods are performed by processing logic that may comprise hardware (circuitry, dedicated logic, etc.), software (such as is run on a general purpose computer system or a dedicated machine), or a combination of both. In one embodiment, the methods of FIGS. 3 and 4 are performed by a video conference system 200 of FIG. 2 or components thereof.

FIG. 3 is a flow diagram of one embodiment of a method 300 for aggregating a list of contextually relevant video conferences. At block 302, the video conference system identifies one or more topics of interest to a user. At block 306, the video conference system identifies active, live and/or pre-scheduled video conferences. At block 308, the video conference system identifies context of each active, live and/or pre-scheduled video conference. At block 310, the video conference system selects active, live and/or pre-scheduled video conferences with context relevant to one or more topics that are of interest to the user. At block 314, the video conference system suggests a list including the selected video conferences. In one embodiment, the video conference system presents the above list on a web page currently viewed by the user. The web page may include a first portion for presenting content (e.g., a video clip, an audio recording or a news article) and a second portion for presenting the list of video conferences to the user. An exemplary user interface illustrating the presentation of content and the presentation of a list of video conferences will be discussed in more detail below in conjunction with FIG. 5A.

FIG. 4 is a flow diagram of one embodiment of a method 400 for aggregating a list of member-wise relevant video conferences. At block 402, the video conference system identifies participants (also referred to herein as members) of active, live and/or pre-scheduled video conferences. At block 404, the video conference system selects those participants that are related to the user. At block 406, the video conference system compiles a list of video conferences with related participants. At block 408, the video conference system suggests the compiled list. In one embodiment, the video conference system presents the above list on a web page currently viewed by the user. The web page may include a first portion for presenting content (e.g., a video clip, an audio recording or a news article) and a second portion for presenting the list of video conferences to the user. An exemplary user interface illustrating the presentation of content and the presentation of a list of video conferences will be discussed in more detail below in conjunction with FIG. 5B.

It should be noted that the operations of method 300 or method 400 may be performed in a different order than the order illustrated in FIG. 3 or FIG. 4. For example, with respect to FIG. 3, the video conference system may first perform operations of blocks 306 and 308 to maintain a list of video conferences in association with pertinent contexts or topics and then presents this list to a user (e.g., with tags representing contexts or topics). The user may indicate a context or topic of interest (e.g., by selecting one of the tags), and the video conference system may identify this context or topic of interest (block 302) and then perform operations of blocks 310 and 314 to suggest relevant video conferences to the user.

Figure 5A:
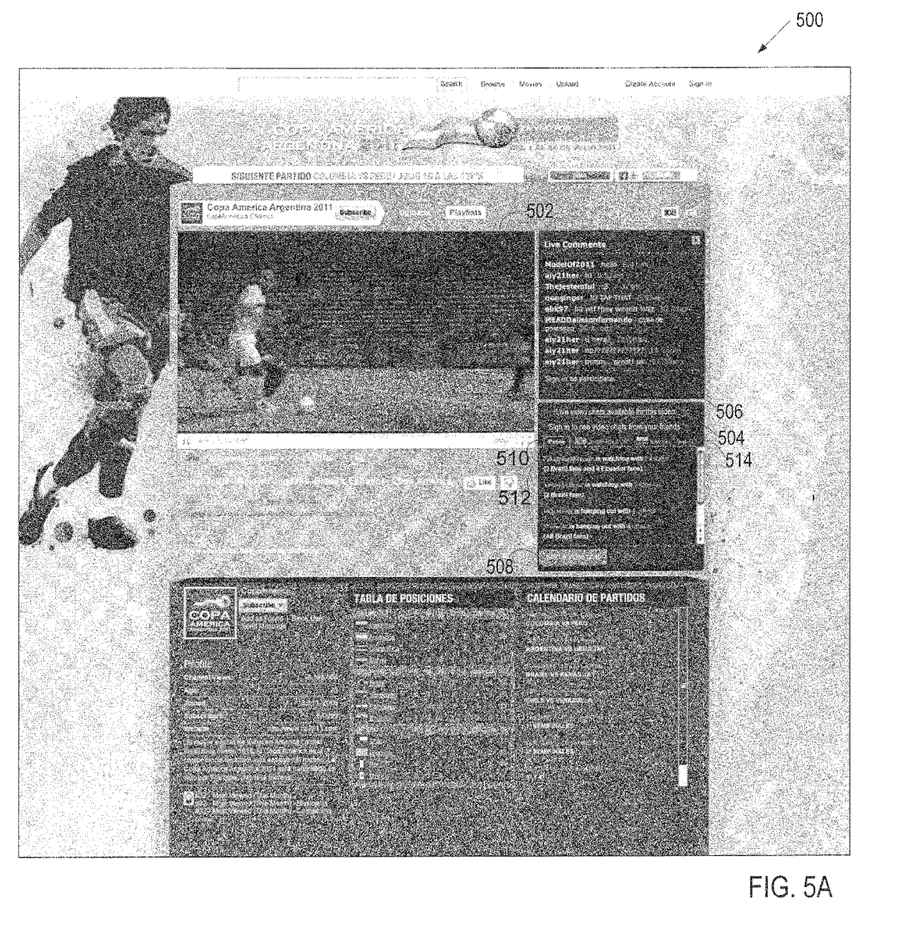
FIG. 5A illustrates an exemplary graphical user interface (GUI) presenting a list of contextually relevant video conferences, in accordance with some embodiments of this disclosure.

FIG. 5A illustrates an exemplary graphical user interface (GUI) 500 presenting a list of contextually relevant video conferences, in accordance with some embodiments of the invention. GUI 500 may be provided by a web or video hosting service and include portion 502 for playing a video and portion 506 for presenting a list of contextually relevant video conferences (referred to in FIG. 5 as video chats). Portion 506 also includes a GUI element 508 in the form of a button to allow a user to start a new video conference.

In the illustrated embodiment, the video conferences included in the list 506 have context (e.g., topic or content) that is relevant to the video played in portion 502 of the GUI 500. The user can select a video conference from the list 506 by, for example, hovering over a list item with a mouse control or highlighting it with a keyboard, and join the video conference using a designated GUI element (e.g., a link or another element not shown).

In the example shown in FIG. 5A, the video played in portion 502 shows a football game between Brazil and Ecuador, and the user can see a list of public live video conferences 510 relevant to this football game. As shown, the user can choose to see a list of video conferences involving only Brazil fans 512 or a list of video conferences involving only Ecuador fans 514. The user may also sign in to the video conference service using link 504 to be able to see a list of contextually relevant video conferences with participants related to the user.

Figure 5B:
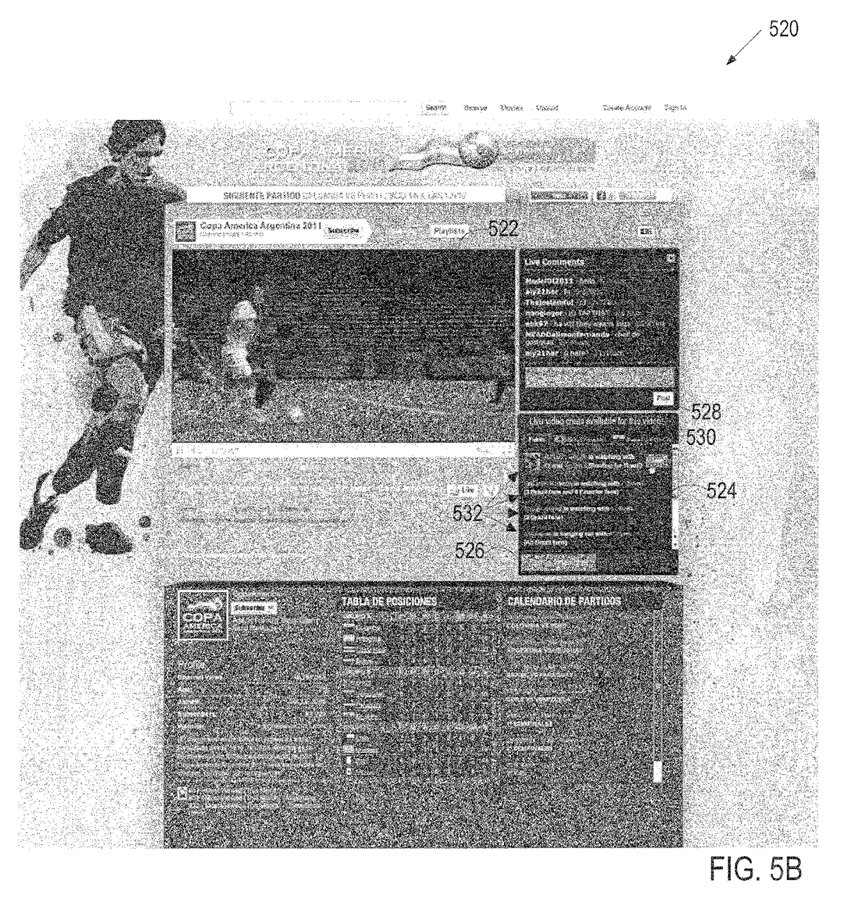
FIG. 5B illustrates an exemplary GUI presenting a list of contextually and member-wise relevant video conferences, in accordance with some embodiments of this disclosure.

FIG. 5B illustrates an exemplary GUI 520 presenting a list of contextually and member-wise relevant video conferences, in accordance with some embodiments of this disclosure. GUI 520 may be provided by a web or video hosting service and include portion 522 for playing a video and portion 524 for presenting a list 528 of contextually and member-wise relevant video conferences. Portion 524 also includes a GUI element 526 in the form of a button to allow a user to start a new video conference.

In the illustrated embodiment, the video conferences included in the list 528 have context (e.g., topic or content) that is relevant to the played video and involve participants 532 who are friends with the user. The user can select a video conference from the list 528 by, for example, hovering over a corresponding list item with a mouse control or highlighting it with a keyboard, and join the video conference using a GUI element (e.g., button 530 or another GUI element).

Figure 6:
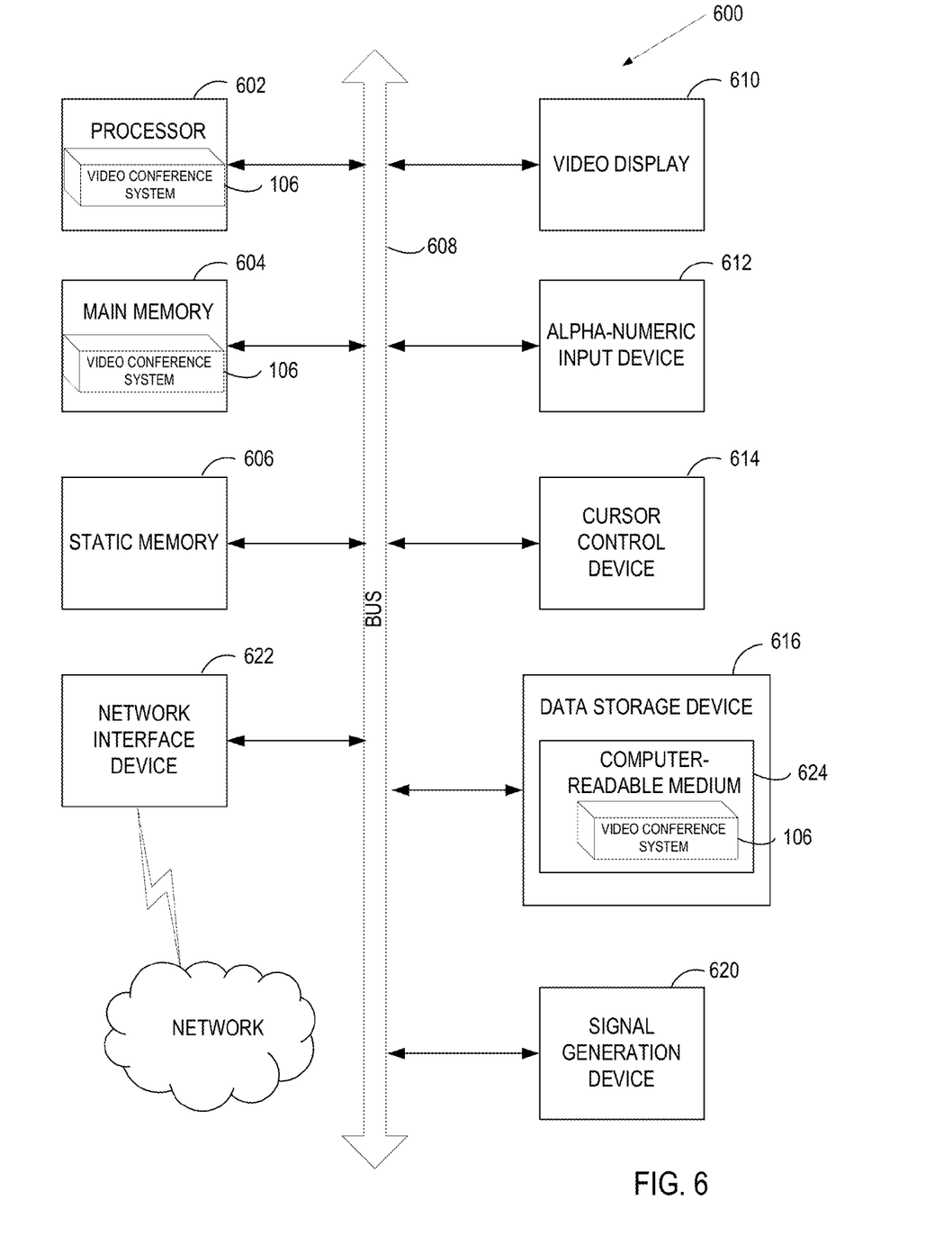
FIG. 6 is a block diagram of an exemplary computer system that may perform one or more of the operations described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions of the video conference system 106 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions of the video conference system 106 embodying any one or more of the methodologies or functions described herein. The instructions of the video conference system 106 or 200 may also reside, completely or at least partially, within the main memory 604 and/or within the processor 602 during execution thereof by the computer system 600, the main memory 604 and the processor 602 also constituting computer-readable storage media. The instructions 106 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
   identifying, by a computing device, a user to be consuming content on a user interface of a video conference system;
   identifying, by the computing device, one or more live video conferences of interest to the user to be consuming the content on the user interface of the video conference system; and
   providing a live video conference list specific to the user, the live video conference list being created for the user and comprising the live video conferences of interest to the user, the live video conference list to be presented to the user with the content on the user interface of the video conference system, wherein each live video conference in the live video conference list is available to be joined by the user consuming the content on the user interface of the video conference system, without an invitation from participants of the live video conference.

2. The method of claim 1 further comprising:
   enabling the user consuming the content on the user interface of the video conference system, to join a live video conference selected from the live video conference list.

3. The method of claim 1, wherein each live video conference includes at least one active participant.

4. The method of claim 1, wherein identifying the live video conferences of interest to the user comprises:
   identifying one or more topics of interest to the user;
   identifying context of each of a plurality of available live video conferences; and
   finding at least one of the plurality of available live video conferences that has context relevant to any of the topics of interest.

5. The method of claim 4, wherein the topics of interest are identified based on a search request submitted by the user.

6. The method of claim 4, wherein the topics of interest are identified based on at least one of a content item currently presented to the user, a content item recommended to the user, or a content item previously presented to the user.

7. The method of claim 6, wherein the content item comprises two or more of video content, audio content or text content.

8. The method of claim 4, wherein the context of each available live video conference is identified based on a combination of a topic of a live video conference, a name of the live video conference, and content of the live video conference.

9. The method of claim 1, wherein identifying the live video conferences of interest to the user comprises:
   identifying participants of available live video conferences;

selecting one or more of the identified participants who are related to the user; and identifying live video conferences with the selected participants.

10. A method comprising:

presenting a user interface of a video conference system for viewing by a user of the video conference system;

receiving a live video conference list specific to the user, the live video conference list being created for the user and comprising one or more live video conferences with context relevant to at least one of one or more topics identified as topics of interest to the user;

presenting the live video conference list specific to the user in the user interface, wherein each live video conference in the live video conference list is available to be joined by the user viewing the user interface, without an invitation from a participant of the live video conference; and enabling the user viewing the live video conference list to join a live video conference selected from the live video conference list.

11. The method of claim 10, wherein the user interface comprises a first portion for presenting a playback of a video stream and a second portion for presenting the live video conference list.

12. The method of claim 10, wherein the topics of interest are identified based on at least one of a profile of the user, or a live videoconference sponsored or participated in by the user.

13. The method of claim 10, wherein the topics of interest are identified based on at least one of a content item currently presented to the user, a content item recommended to the user, or a content item previously presented to the user.

14. The method of claim 10, wherein the context of each live video conference is identified based on a combination of a topic of a live video conference, a name of the live video conference, and content of the live video conference.

15. The method of claim 10, further comprising:

presenting a new list comprising a subset of the one or more live video conferences, wherein the subset comprises only live video conferences of the one or more live video conferences with at least one participant who is related to the user.

16. The method of claim 15, wherein the at least one participant who is related to the user is a friend of the user on a social networking site.

17. The method of claim 15, wherein the at least one participant who is related to the user is a participant having a history of engagement with the user.

18. The method of claim 15, wherein the at least one participant who is related to the user is a participant associated with content subscribed to by the user.

19. The method of claim 15, wherein the at least one participant who is related to the user is a participant with a content viewing history similar to a content viewing history of the user.

20. The method of claim 15, wherein the at least one participant who is related to the user is a participant having an affiliation similar to an affiliation of the user.

21. A computing device comprising:

a memory; and a processing device, coupled to the memory, to:

present a user interface of a video conference system for viewing by a user of the video conference system;

receive a live video conference list specific to the user, the live video conference list being created for the user and comprising one or more live video conferences with context relevant to at least one of one or more topics identified as topics of interest to the user;

present the live video conference list specific to the user in the user interface, wherein each live video conference in the live video conference list is available to be joined by the user viewing the user interface, without an invitation from a participant of the live video conference; and enable the user viewing the live video conference list to join a live video conference selected from the live video conference list.

22. The computing device of claim 21, wherein the processing device is further to:

present a new list comprising a subset of the one or more live video conferences, wherein the subset comprises only live video conferences of the one or more live video conferences with at least one participant who is related to the user.

* * * * *